Nov. 11, 1941.  R. H. WEBSTER  2,262,349
ROAD GRIP FOR VEHICLE TIRES
Filed June 24, 1939  2 Sheets-Sheet 1

INVENTOR.
Russell H. Webster
BY
ATTORNEYS.

Nov. 11, 1941.   R. H. WEBSTER   2,262,349
ROAD GRIP FOR VEHICLE TIRES
Filed June 24, 1939   2 Sheets-Sheet 2

INVENTOR.
Russell H. Webster
BY
ATTORNEYS.

Patented Nov. 11, 1941

2,262,349

UNITED STATES PATENT OFFICE 2,262,349

ROAD GRIP FOR VEHICLE TIRES

Russell Henry Webster, Providence, R. I.

Application June 24, 1939, Serial No. 281,043

4 Claims. (Cl. 152—175)

This invention relates to improvements in vehicle tires and more particularly to vehicle tire anti-skid devices, and the primary object of the invention is to provide means for gripping a wet, icy, snow-covered or otherwise slippery roadway.

Another object of the invention is to provide road gripping means for vehicle tires and permitting operation of a vehicle over smooth or hard surfaced roadways without bumping such as is the case with conventional anti-skid tire chains.

A further object of the invention is the provision of road gripping means for vehicle tires and which will afford improved traction on sandy or muddy roads.

A still further object is to provide road gripping means in conjunction with a vehicle tire and tending to prevent puncture of the tire.

Yet another object is the provision of road gripping means for a vehicle tire tending to eliminate cuts and bruises such as caused by conventional anti-skid tire chains.

Other objects and advantages of the invention will become apparent during the course of the following detailed description, taken in connection with the accompanying drawings, forming a part of this specification, and in which drawings.

Figure 1:
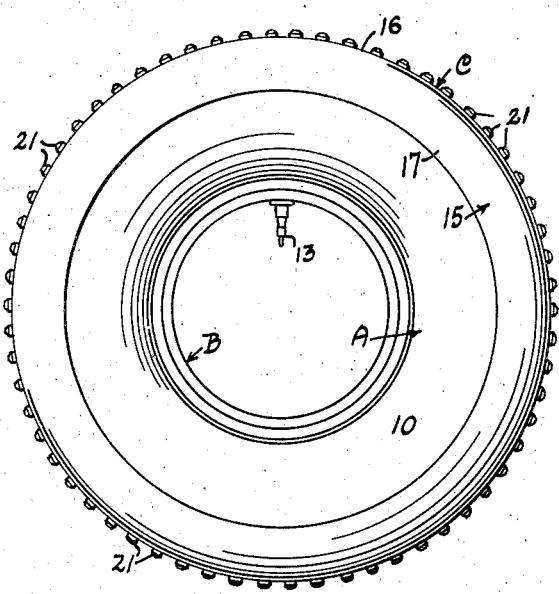
Figures 1 and 2 are side elevation and top plan views respectively, of my improved road gripping means applied to a vehicle tire.
Figure 2:
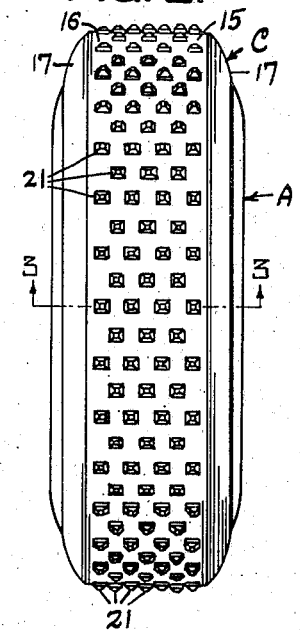

In the drawings, which for the purpose of illustration show only a preferred embodiment of the invention, and wherein similar reference characters denote corresponding parts thruout the several views, A designates a vehicle tire, mounted on a rim B and provided with my improved road gripping means C.

In the example shown, the tire A comprises a pneumatic casing 10 including a tread portion 11 and provided with an inner tube 12 having a valve 13. The rim B may be the usual drop center type.

Referring now to the road gripping means C, the same includes a resilient annular band 15 of any suitable material such as rubber, including a central portion 16, adapted to encircle the tread portion 11 of the tire A, and inwardly extending flanges 17 adapted to engage the sides of the tire when the tube thereof is inflated.

Figure 4:
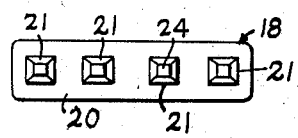
Figures 4 and 5 are top plan views of calk units preferably forming part of my road gripping means.
Figure 5:
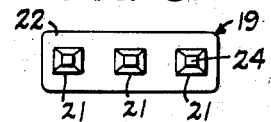

The road gripping means C preferably utilizes a plurality of calk units 18—19, formed of any suitable material, such as metal, as by casting. The calk units 18, as shown in Figure 4, each comprises an oblong base plate 20 and a row of projections 21 extending from the base plate. The calk units 19, as shown in Figure 5, each comprise an oblong base plate 22, and a row of projections 21 extending therefrom. In the present instance, each calk unit 18 includes four projections in a row and each calk unit 19 is provided with three projections in a row, although it will be understood that the number may vary so as to conform to varying widths of tires. Each projection 21 preferably comprises a rectangular base portion 23 and a quadrangular frusto-pyramidal cap portion 24.

Figure 6:
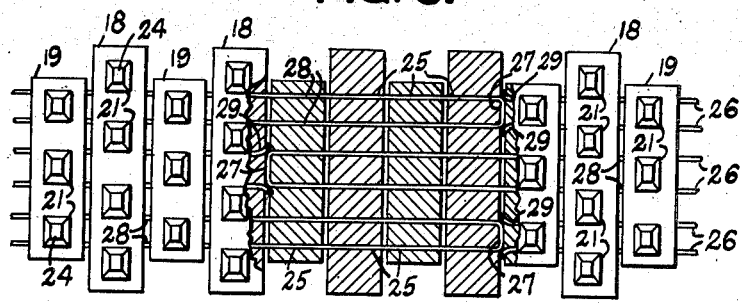
Figure 6 is a view partly in plan and partly in horizontal section and showing a plurality of articulated calk units.
Figure 7:
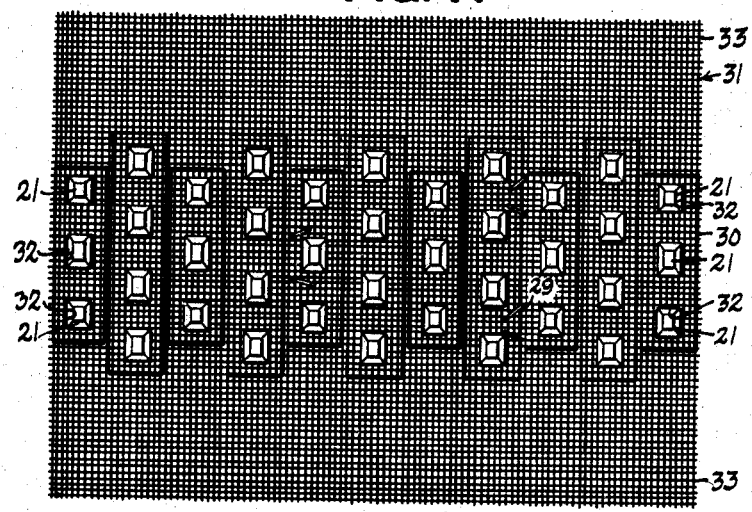
Figure 7 is a plan view showing a section of screen partially secured to said calk units.

Referring to Figure 6 of the drawings, it will be noted that the units 18—19 are disposed in alternating parallel relationship with the projections of the units 18 in offset or staggered relation to the projections of the units 19. Extending thru aligning openings 25 in the base plates and circumferentially of the gripping means C are cables 26 which articulate the units 18—19 to form an endless series. In the example illustrated, three cables 26 are provided, each of a length greater than twice the circumference of the gripping means C, to provide bight portions 27 and opposite end portions 28 extending from the bight portions 27 thru openings 25 and terminating in free ends 29. Preferably, the bight portions of adjacent cables are offset circumferentially of the gripping means C, so as to more efficiently distribute any strains on the cables.

Extending over the base plates of the calk units 18—19 is the central portion 30 of a flexible screen 31, provided with openings 32 thru which the projections 21 extend. Folded beneath the base plates of the calk units 18—19 are marginal portions 33 at opposite sides of the central portion. As the combined width of the marginal portions 33 is substantially equal to the width of the central portion 30, two layers of screen material are formed, one inwardly of the other. If desired, the free ends 29 of cables 26 may be laced thru the screen 31 for anchoring purposes.

Figure 3:
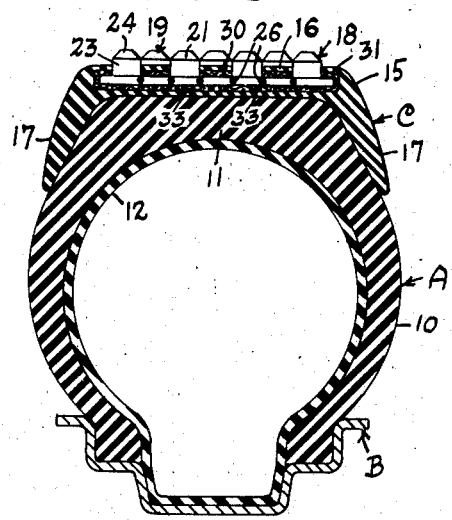
Figure 3 is a cross sectional view thereof taken substantially on the line 3—3 of Figure 2.
Figure 8:
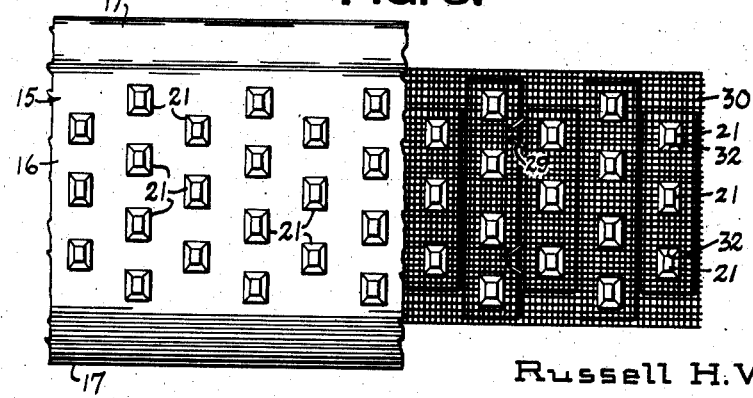
Figure 8 is a plan view showing the screen wrapped around the calk units, a portion of the screen being embedded in rubber.

As shown in Figures 3 and 8, the screen 31 is embedded in the central portion 16 of the resilient annular band 15 with the projections 20 extending therefrom. I prefer to mold the band 15 around the screen so that the screen will be permeated as well as coated with the material of the band, and so that a definite contour is imparted to the side flanges 17 of the resilient annular band.

From the foregoing description, it will be noted that the double layer of screen material provides a practically impregnable barrier to nails, glass and foreign objects, and also distributes the highly concentrated weight borne by the calk units over a large area.

While I have shown the gripping means C as an assembly separable from the tire A, as by deflation of the tube thereof, it will be understood that the gripping means C may be formed integrally with the tire or permanently fastened thereto.

Various changes may be made in the form of invention herein shown and described without departing from the spirit of the invention or the scope of the following claims.

I claim:

1. A tire tread comprising a resilient annular band, a reticulate strip including a central portion and marginal portions at opposite sides of the central portion, and a plurality of calks including base plates adjacent the central portion of the strip and projections extending from the base plates thru said strip, the marginal portions of the strip being folded into substantial engagement with said base plates, said strip being embedded in said annular band and said projections extending therefrom.

2. A tire tread comprising a resilient annular band, a plurality of calks in parallel rows extending transversely of the annular band, said calks including base plates embedded in the annular band and provided with pairs of openings extending circumferentially of the band, and cables including transverse bight portions and opposite end portions extending from said bight portions and thru said pairs of openings, the free ends of adjacent cables being secured in circumferentially spaced relation to the band.

3. A tire tread comprising a resilient annular band, an annular reticulate flexible strip, a plurality of calks in parallel rows extending transversely of the strip, said calks including base plates adjacent the strip and projections extending from the base plates thru the strip, said base plates being provided with openings extending circumferentially of the strip, and cables extending thru said openings and including free end portions laced thru apertures of said reticulate strip, said strip being embedded in said annular band and said projections extending therefrom.

4. A tire tread comprising a resilient annular band, inner and outer spaced annular layers of flexible wire cloth material, a plurality of calks including base plates disposed between said layers and projections extending from the base plates thru said outer layer, said layers being embedded in said annular band and said projections extending therefrom.

RUSSELL HENRY WEBSTER.